United States Patent
Cherchi et al.

(10) Patent No.: US 9,419,292 B2
(45) Date of Patent: Aug. 16, 2016

(54) MANAGEMENT OF OPERATION OF PEM-FUEL-CELL-STACK BACKUP ELECTRIC GENERATOR

(75) Inventors: Pierpaolo Cherchi, Turin (IT); Francesco Pedrazzo, Cuneo (IT); Giuseppe Gianolio, Cellarengo (IT)

(73) Assignee: ELECTRO POWER SYSTEMS S.P.A., Moncalieri (Torino) (IT)

( * ) Notice: Subject to any disclaimer, the term of this patent is extended or adjusted under 35 U.S.C. 154(b) by 0 days.

(21) Appl. No.: 13/518,002

(22) PCT Filed: Dec. 21, 2010

(86) PCT No.: PCT/IB2010/003320
§ 371 (c)(1), (2), (4) Date: Jun. 21, 2012

(87) PCT Pub. No.: WO2011/077229
PCT Pub. Date: Jun. 30, 2011

(65) Prior Publication Data
US 2012/0258376 A1  Oct. 11, 2012

(30) Foreign Application Priority Data
Dec. 22, 2009 (IT) .............................. TO2009A1026

(51) Int. Cl.
*H01M 8/04* (2016.01)
*H01M 8/06* (2016.01)
(Continued)

(52) U.S. Cl.
CPC ...... *H01M 8/04559* (2013.01); *H01M 8/04097* (2013.01); *H01M 8/04589* (2013.01); *H01M 8/04761* (2013.01); *H01M 8/1002* (2013.01); *Y02E 60/50* (2013.01); *Y02E 60/521* (2013.01)

(58) Field of Classification Search
USPC .......................................................... 429/415
See application file for complete search history.

(56) References Cited

U.S. PATENT DOCUMENTS 6,737,183 B1 * 5/2004 Mazzucchelli et al. ........ 429/413
6,861,167 B2 * 3/2005 Wells et al. .................... 429/432
(Continued)

FOREIGN PATENT DOCUMENTS

EP 1 826 852 A1 8/2007
WO WO-2004/027912 A2 4/2004

OTHER PUBLICATIONS

International Search Report in International Application No. PCT/IB2010/003320, dated May 24, 2011.
(Continued)

*Primary Examiner* — Ula C Ruddock
*Assistant Examiner* — Osei Amponsah
(74) *Attorney, Agent, or Firm* — R. Ruschena Patent Agent, LLC

(57) ABSTRACT

A PEM-fuel-cell-stack backup electric generator comprising: a fuel-cell stack, formed by a plurality of stacked PEM fuel cells electrically connected in series for supplying electrical energy to an electrical load; a cell-voltage monitor for measuring the voltage supplied by each fuel cell; an electrical-energy management and conditioning unit, connected between the fuel-cell stack and the electrical load; a blower for supplying the amount of air necessary for the chemical reactions that occur in the fuel cells; a hydrogen recirculator for recirculating hydrogen between the outlet and the inlet of the fuel-cell stack; a hydrogen-purging device for carrying out a primary purging of hydrogen at a lower flow rate, and a secondary purging of hydrogen at a higher flow rate; and a controller, programmed for managing operation of the electric generator differently at start-up, at shut-down, and during normal operation thereof.

8 Claims, 1 Drawing Sheet

(51) Int. Cl.
*H01M 8/24* (2016.01)
*H01M 8/10* (2016.01)

(56) References Cited

U.S. PATENT DOCUMENTS

| | | | |
|---|---|---|---|
| 7,282,287 B2* | 10/2007 | Wilson et al. | 429/429 |
| 7,323,263 B2* | 1/2008 | Cargnelli et al. | 429/413 |
| 2005/0244686 A1 | 11/2005 | Kamihara | |
| 2008/0091629 A1* | 4/2008 | Matsumoto et al. | 706/14 |
| 2009/0214909 A1 | 8/2009 | Igarashi et al. | |
| 2011/0048837 A1* | 3/2011 | Kwon | H01M 8/04097 180/309 |

OTHER PUBLICATIONS

IT—PEM Fuel Cells ISBN: 978-0-12-387710-8, 2013, Frano Barbir, p. 118-122; p. 275-280.

* cited by examiner

MANAGEMENT OF OPERATION OF PEM-FUEL-CELL-STACK BACKUP ELECTRIC GENERATOR

CROSS-REFERENCE TO RELATED APPLICATIONS

This application is the U.S. national phase of International Application No. PCT/IB2010/003320, filed Dec. 21, 2010, which claims the benefit of Italian Patent Application No. TO2009A 001026, filed Dec. 22, 2009.

TECHNICAL SECTOR OF THE INVENTION

The present invention relates to a fuel-cell electric generator specifically aimed at providing backup in the absence of electric mains supply, wherein a plurality of fuel cells are stacked for generating electrical energy starting from a fuel gas and an oxidizing gas supplied, respectively, on a fuel-gas electrode (anode) and an oxidizing-gas electrode (cathode). In particular, the invention regards a system of fuel cells of the proton-exchange-membrane (PEM) type which uses hydrogen as fuel, wherein a particular management of humidification of the PEM cells is carried out.

STATE OF THE ART

As is known, maintenance of a proper humidification is one of the most delicate aspects as regards management of a system for generation of electrical and thermal energy based upon PEM-fuel-cell technology.

Fuel cells represent one of the technologically most promising solutions for the use of hydrogen as energy vector. These are devices that, by exploiting an electrochemical reaction, can convert chemical energy into electrical energy.

In a single PEM cell, two semireactions take place simultaneously, one at the anode and one at the cathode. The anode and the cathode of a PEM cell are separated by an electrolyte, typically constituted by a membrane of a sulphonated polymer capable of conducting protons, the opposite sides of which are coated with a layer of an appropriate catalytic mixture (for example, a Pt-based mixture). The electrolyte is generally saturated with an ion-transport fluid (for example, water) in such a way that the hydrogen ions can traverse it from the anode to the cathode.

The global reaction occurring in a fuel cell is $$2H_2 + O_2 \rightarrow 2H_2O \quad (1)$$

which is accompanied by the development of heat and electrical energy and results from the sum of two semireactions that take place, respectively, at the anode, namely $$2H_2 \rightarrow 4H^+ + 4e^- \quad (2)$$

and at the cathode, namely $$O_2 + 4H^+ + 4e^- \rightarrow 2H_2O \quad (3)$$

Hence, supplied to the anode is the hydrogen, which diffuses within the catalytic layer and is there dissociated into hydrogen ions and electrons, which, given that the membrane is impermeable to them, traverse an external electrical circuit as far as the cathode, generating an electric current and the corresponding difference of potential. Supplied instead to the cathode is a gaseous mixture containing oxygen, which reacts with the hydrogen ions that have traversed the electrolyte and the electrons coming from the external electrical circuit.

It is necessary for the reagent gases to be humidified because it is precisely on account of the water molecules that passage of the protons occurs through the polymeric membrane: an excessively low degree of humidity leads to a greater difficulty of passage of protons from the anodic compartment to the cathodic compartment, with consequent drop in the levels of performance of the fuel cell, whilst an excessively high degree of humidity condenses in the liquid state, with consequent occlusion of the catalytic sites and drop in the levels of performance of the fuel cell. The humidification of reagent gases is hence a very delicate parameter in managing a fuel-cell system.

Since the generation of a well-defined maximum voltage is associated to the reaction (1), in order to reach a higher voltage, a plurality of fuel cells is generally connected in series so as to form a stack.

In addition to the stack, a fuel-cell electric generator specifically aimed at providing backup in the event of lack of mains supply comprises a hydraulic circuit (pump, pipes, dissipaters, etc.), a circuit for supply and exhaust of the currents of gas (pipes for supply of hydrogen, pipes for supply of oxidizing gaseous mixture, etc.), a control system (control unit, meters for measuring the temperature, flow rate, and pressure, actuators, etc.). The ensemble of these elements is commonly referred to as "Balance of Plant" (BoP). In numerous known embodiments of such a system, the BoP comprises a device for humidifying the air at inlet to the stack, possibly with recovery of the water produced during the process. This device is in general constituted by a series of polymeric membranes that enable transfer by osmotic gradient of the water molecules from the outgoing gas, which passes over a part of the membrane, to the incoming gas, which passes over the other side of the membrane.

Some embodiments moreover envisage recirculation and mixing with the "new" gas of at least a part of the flow exiting from the stack thanks to the use of a blower or a pump, which entails, however, a drop in efficiency, an increase in noise of the system, and an increase in the risk of failure.

Finally, air is generally used as cathodic gas, and a blower or a pump is hence necessary for supplying the stack, overcoming the losses of head of the cathodic circuit itself.

A system including all the characteristics described above is known, for example, from the document No. U.S. Pat. No. 5,543,238. In said system, a recirculation is carried out, by means of compressors, of part both of the cathodic gas and of the anodic gas at outlet. However, it is necessary to maintain a system for humidifying at least the anodic gas that functions by means of an external humidity source.

SUBJECT AND SUMMARY OF THE INVENTION

As may be inferred from what has been described so far, the known embodiments of backup electric-generating systems are relatively costly and cumbersome and require maintenance of an accurate and careful routine to prevent them from becoming unreliable in so far as, given that they are backup systems and are consequently designed to intervene only intermittently, the moving parts (pumps, compressors, etc.), for example, require accurate controls in order not undergo breakdown just when they are needed.

Furthermore, the known systems always envisage the use of a humidifying system, whether this functions with water supplied from outside or with water in part recovered via the aforementioned membrane exchangers. In fact, as mentioned previously, proper operation of a PEM fuel cell in an energy-generating system that can be exploited by the user requires a proper degree of humidification of the membrane: a low content of water in the cells leads to dehydration of the fuel cells and consequent reduction of the service life of the stack, whereas a high content of water reduces inflow of the reagents and consequently reduces the generation of electric power available to the user. The degree of humidification of the membrane has an impact above all during starting and stopping, above all if the starts are separated in time from one another, as occurs for energy-generating systems used in backup applications.

The existing solutions are normally concentrated on the search for membrane-electrode assemblies (MEAs) made of materials that are not subject to problems of over- or under-hydration. Said solutions, however, do not afford the possibility of direct intervention on the electric generator in the event of problems encountered by the user, for example temporary occlusion of a fuel cell or low hydration.

The aim of the present invention is consequently to provide a fuel-cell electric generator specifically devised for backup applications that will overcome the drawbacks described above, in particular will enable reduction of the plant and running costs and increase of the efficiency and reliability of the electric generator, at the same time reducing the overall dimensions thereof, and that will enable direct intervention on the electric generator in the face of a critical situation duly detected.

According to the present invention, a PEM-fuel-cell-stack backup electric generator is provided as defined in claim 1.

BRIEF DESCRIPTION OF THE DRAWINGS

For a better understanding of the present invention, a preferred embodiment thereof will now be described, purely by way of non-limiting example, with reference to the attached drawings, wherein.

Figure 1:
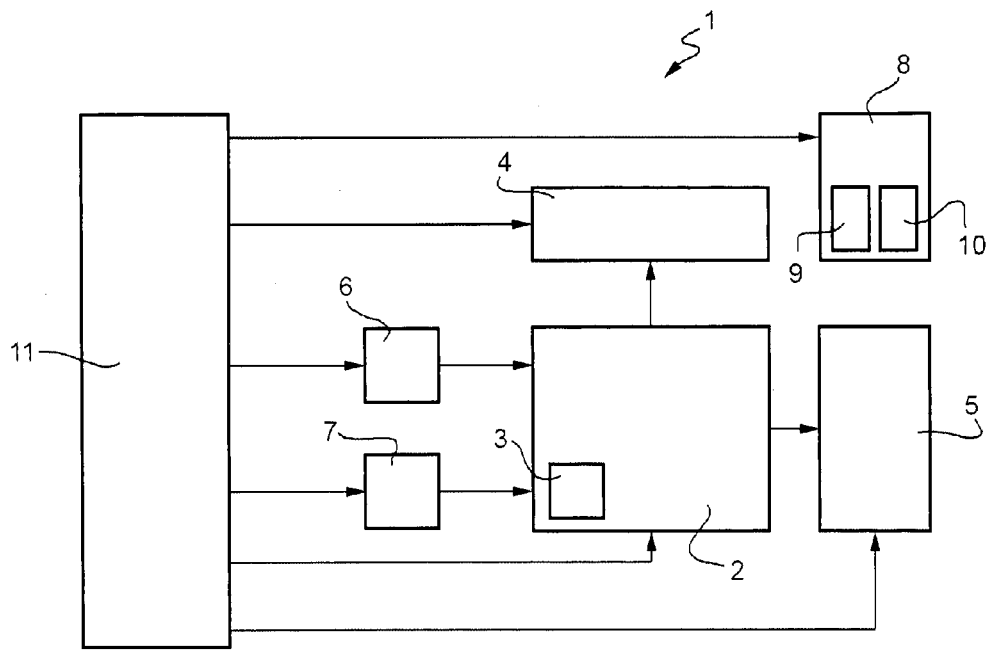
FIG. 1 shows the block diagram of a PEM-fuel-cell-stack backup electric generator, of which only the parts necessary for an understanding of the present invention are shown.

Designated as a whole by 1 in FIG. 1 is a PEM-fuel-cell-stack backup electric generator basically comprising:
 a fuel-cell stack 2 formed by a plurality of stacked PEM fuel cells 3, electrically connected in series for supplying electrical energy to an electrical load (not shown);
 a cell-voltage monitor (CVM) 4, coupled to the fuel-cell stack 2 for measuring the voltage supplied by each fuel cell 3;
 an electrical-energy management and conditioning unit 5, connected between the fuel-cell stack 2 and the electrical load;
 a blower 6, designed to supply the amount of air necessary for the chemical reaction that takes place in each fuel cell 3;
 a hydrogen recirculator 7 for recirculating hydrogen between the outlet and the inlet of the fuel-cell stack 2;
 a hydrogen-purging device 8 for releasing a part of hydrogen into the environment or into the cathodic circuit, which comprises a pair of calibrated hydrogen-purging valves 9, 10, a primary and a secondary, such as to carry out, respectively, a primary purging of hydrogen at a lower flow rate, and a secondary purging of hydrogen at a higher flow rate; and
 an electronic controller 11, which is connected to the cell-voltage monitor 4, to the electrical-energy management and conditioning unit 5, to the blower 6, to the hydrogen recirculator 7 and to the hydrogen-purging device 8 and is configured for managing operation of the electric generator 1 according to the modalities described in what follows, which enable operation of the fuel-cell stack 2 in optimal membrane-humidification conditions, preserving the useful service life thereof, and always supplying the electric power required by the electrical load.

Each fuel cell 3 basically comprises a membrane-electrode assembly (MEA) and two bipolar plates, which are assembled using secondary components, such as gaskets, head portions, springs, or closing tie rods. The membrane-electrode assembly is dedicated to splitting of the hydrogen atom into proton and electron, and has an operating temperature of approximately 70° C. and a relative humidity of 70.5% at 70° C. The two bipolar plates, which operate in an optimal way in the presence of monobasic fluids, perform, instead, the function of transporting the reagents (air or oxygen, hydrogen) to the membrane-electrode assembly and of acting as collectors of electric current.

Figure 2:
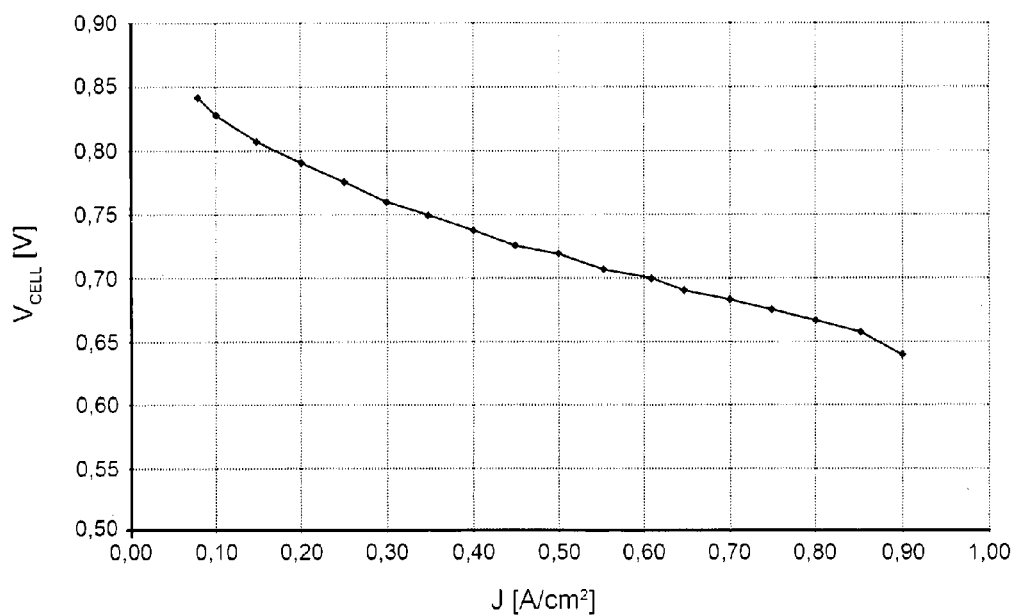
FIG. 2 shows the plot of the voltage of a single fuel cell as a function of the current density.

The voltage of a single fuel cell 3 is a function of the electric power required from the fuel cell 3 itself and follows the plot represented in FIG. 2, where the axis of the ordinates indicates the average voltage of a fuel cell 3 measured at 60° C., whereas the axis of the abscissae indicates the electric-current density required of the fuel cell 3 itself.

Thanks to the electrical connection in series of the fuel cells 3, the voltage supplied by the fuel-cell stack 2 is nothing but the sum of the voltages supplied by the individual fuel cells and presents a plot similar to the one shown in FIG. 2. The uniformity in the distribution of the voltage supplied by the individual fuel cells is a key parameter for the performance and duration of the membrane-electrode assemblies.

The voltage supplied by each fuel cell 3 is measured via the cell-voltage monitor 4, which is mounted on the fuel-cell stack 2 and is provided with purposely designed metal prods connected to the individual fuel cells 3. The voltage supplied by each fuel cell 3 is measured at a frequency higher than the time constants typical of the fluid-dynamic phenomena within a fuel cell 3, for example every 20 ms.

The plot of the voltage generated by the fuel-cell stack 2 means that the electrical energy generated by the electric generator 1 is not optimal for a direct use by the electrical load. Said drawback is overcome by the electrical-energy management and conditioning unit 5, which, in addition to measuring the electric current supplied by the fuel-cell stack 2, has the task of causing the latter to supply the electric power required by the electrical load at the same time operating in optimal conditions throughout the service life of the fuel-cell stack 2 in terms of voltage and current.

For the above purpose, the electrical-energy management and conditioning unit 5 is constituted by static elements for conversion of the electrical energy, such as semiconductor devices (diodes, MOSFETs), inductive and capacitive reactances connected according to a topology of a boost or buck type, i.e., able to convert the electrical energy by varying the voltage and current thereof; namely, one of the two values is varied independently and the other as a consequence of the electric-power demand. Said task can be performed also through management of a bridge unit (batteries or supercapacitors).

As regards the function of the hydrogen recirculator 7, the hydrogen within the fuel-cell stack 2 can ideally be decomposed into two components: hydrogen taken from the storage for subsequent conversion into electrical energy, and hydrogen recirculated in order to maintain an adequate relative humidity within the fuel-cell stack 2. In conditions of full electric power, the two contributions are brought into the proportion of approximately 4:3 which has been experimentally found to be the optimal ratio. The part of hydrogen recirculated is removed from the outlet of the fuel-cell stack 2 and brought to the inlet thereof through the hydrogen recirculator 7, which has as further function that of increasing the pressure of the hydrogen recirculated from the outlet to the inlet of the fuel-cell stack 2, typically from 20 to 50 mbar.

The controller 11 is programmed for: acquiring the measurements of voltage and current supplied respectively by the cell-voltage monitor 4 and by the electrical-energy management and conditioning unit 5; determining performance targets for the electrical-energy management and conditioning unit 5, the blower 6, and the hydrogen recirculator 7 on the basis of the measurements acquired and of management logics described in what follows; and appropriately controlling the electrical-energy management and conditioning unit 5, the blower 6, the hydrogen recirculator 7, and the hydrogen-purging device 8 in such a way as to achieve the given performance targets.

In particular, the controller 11 is programmed for implementing different management logics of operation of the electric generator 1 according, that is, to the modes of operation of the electric generator: one specific for start-up, one specific for normal operation, and one specific for shut-down; said modes are described separately hereinafter in detail.

1. Start-Up

Start-up of the electric generator 1 is a particularly critical step on account of the so-called "load acceptance", during which the fuel-cell stack 2 is made to supply the electric power required by the electrical load without any fuel cell 3 having problems of humidity and humidification. For said purpose, the controller 11 is programmed for:

opening the primary hydrogen-purging valve 9 and keeping it open, thus carrying out a continuous primary purging of hydrogen; and cyclically opening and closing the secondary hydrogen-purging valve 10, thus carrying out a cyclic secondary purging of hydrogen, according to a duty cycle in which, starting from initial values of the times of closing and opening of the secondary hydrogen-purging valve 10, corresponding, respectively, to 9 s and 4 s, the opening time is increased at each duty cycle by a given amount, conveniently 20%, until one of the following conditions is verified:

the voltage of a fuel cell 3 is lower than a given minimum admissible voltage, conveniently 0.4 V;

the voltage of a fuel cell 3 varies, with respect to a nominal reference value obtained experimentally on each type of stack in optimal conditions of humidification, by an amount greater than a maximum admissible variation, conveniently equal to 10%; and the voltage of the fuel-cell stack 2 varies, with respect to a nominal reference value, by an amount greater than a maximum admissible variation, conveniently equal to 10%, for a time longer than a maximum admissible time, conveniently equal to 60 s; and a time longer than a maximum admissible time has elapsed, conveniently two minutes, from turning-on of the electric generator 1.

2. Normal Operation

Normal operation of the electric generator 1 can constitute a critical step because, on account of momentary dehydration or "flooding" of the membrane-electrode assemblies, the fuel-cell stack 2 may find itself operating in non-optimal conditions for supply of electric power with consequent reduction of the useful service life of the stack itself and possible inefficient service to the user.

Consequently, once the start-up step has terminated, the controller 11 is programmed for controlling the electrical-energy management and conditioning unit 5 in such a way that, on the basis of the electric power required by the electrical load, the electric current drawn off from the fuel-cell stack 2 will rise with a given rate of increase, conveniently 10 A/s, and then settle to a value of electric current corresponding to the electric power required by the electrical load and in any case not higher than a given maximum value, conveniently 180 A.

Furthermore, the controller 11 is programmed for:

detecting that one of the following conditions is verified:

the voltage of a fuel cell 3 is lower than a given minimum admissible voltage, conveniently 0.4 V;

the voltage of a fuel cell 3 varies, with respect to a nominal reference value, by an amount greater than a maximum admissible variation, conveniently equal to 10%; and the voltage of the fuel-cell stack 2 varies, with respect to a nominal reference value, by an amount greater than a maximum admissible variation, conveniently equal to 10%, for a time longer than a maximum admissible time, conveniently 60 s; and when one of the aforesaid conditions is verified, controlling the electrical-energy management and conditioning unit 5 in such a way that the electric current drawn off from the fuel-cell stack 2 will diminish with a given rate of decrease, once again conveniently of 10 A/s, until the condition detected ceases. The electrical energy is supplied to the electrical load partially through management of the bridge unit.

Furthermore, the controller 11 is programmed for managing the hydrogen recirculator 7, the blower 6, and the hydrogen-purging device 8 as a function of the electric power supplied by the electrical-energy management and conditioning unit 5. In particular, when one of the aforesaid conditions is verified, the controller 11 is programmed for activating the blower 6 in such a way that it will supply a given flow rate of air over and above what is normally required, for example 4% more, and for controlling the primary and secondary hydrogen-purging valves 9, 10 as described in the start-up procedure.

3. Shut-Down

Shut-down of the electric generator 1 can constitute a critical step because water may remain in the bipolar plates of a fuel cell 3, which could occlude delivery of reagents to the corresponding membrane-electrode assembly and hence prevent the fuel cell 3 from being brought into a condition of low hydration necessary for enabling a subsequent start-up of the electric generator 1.

In order to prevent this problem, the controller 11 is programmed for:

waiting for cooling of the fuel-cell stack 2 to a temperature conventionally set at 20° C., accelerating the expulsion of the heat accumulated with the aid of the forced-cooling systems;

at the end of cooling, actuating the blower 6 for eliminating the water condensed during cooling; and opening the primary hydrogen-purging valve 9 and keeping it open, thus carrying out a continuous primary purging of hydrogen.

From an examination of the characteristics of the PEM-fuel-cell-stack backup electric generator 1 according to the present invention the advantages that it presents over known electric generators of the same type are evident. In particular, it not only presents a higher efficiency and reliability as compared to known electric generators of the same type, but also enables direct intervention of an operator in the event a critical situation appropriately detected.

Finally, it is clear that modifications and variations may be made to the PEM-fuel-cell-stack backup electric generator described and illustrated without thereby departing from the sphere of protection of the present invention, as defined in the annexed claims.

In particular, the minimum admissible voltage, the maximum admissible variation, the maximum admissible time, the rates of increase and decrease of the electric current drawn off, and the maximum current that can be achieved can assume values different from the ones indicated previously.

The invention claimed is:

1. A procedure for controlling a PEM-fuel-cell-stack backup electric generator (1), said backup electric generator (1) comprising:
    a controller (11) operated by a loaded software configured for managing operations of said backup electric generator (1) to supply electrical energy to an electric load, said operations comprising:
    an automatic startup operation thus allowing the PEM-fuel-cell-stack electric generator (1) to function as a backup electric generator in the event of lack of mains electric supply;
    a normal operation
    a shut-down operation;
    a fuel-cell stack (2) formed by a plurality of stacked PEM fuel cells (3), electrically connected in series,
    a cell-voltage monitor (4) for measuring the voltage supplied by each fuel cell (3), measured at a frequency of 20 ms;
    an electrical-energy management and conditioning unit (5), connected in between the fuel-cell stack (2) and the electrical load;
    to measure the electric current supplied by the fuel-cell stack (2) and causing said fuel-cell stack (2) to supply electrical power required by the electrical load;
    and wherein said electrical-energy management and conditioning unit (5) comprises static elements for conversion of the electrical energy, such as semiconductor devices, inductive and capacitive reactances connected according to a topology of a boost or buck converter, able to convert the electrical energy by varying the voltage and current thereof; namely, one of the two values is varied independently and the other as a consequence of the electric-power demand;
    a blower (6) for supplying the amount of air necessary for the chemical reactions that occur in the fuel cells (3);
    a hydrogen recirculator (7) for recirculating hydrogen between the outlet and the inlet of the fuel-cell stack (2); and increasing the pressure of the hydrogen between the outlet and the inlet of the fuel-cell stack (2);
    a hydrogen-purging device (8), configured for carrying out a primary purging of hydrogen at a lower flow rate by opening a primary hydrogen-purging valve (9) and keeping it open, and a secondary purging of hydrogen at a higher flow rate by opening and closing a secondary hydrogen-purging valve (10);
    and wherein said controller (11), is connected to the cell-voltage monitor (4), the electrical-energy management and conditioning unit (5), the blower (6), the hydrogen recirculator (7), and the hydrogen-purging device (8) wherein said controller (11) is configured for managing the automatic start-up of the electric generator (1) by implementing the following operations:
        controlling the purging device (8) in such a way as to carry out a continuous primary purging of hydrogen; by opening the hydrogen-purging valve (9) and increasing the pressure of the hydrogen recirculated from an outlet to an inlet of the fuel-cell stack (2)
        controlling the purging device (8) in such a way as to carry out a cyclic secondary purging of hydrogen according to a duty cycle, cyclically opening and closing the secondary hydrogen-purging valve (10), in which, starting from a given initial value, the purging time is increased by a given amount at each duty cycle, until one of the following conditions is verified:
        the voltage of a fuel cell (3) is lower than a given minimum admissible voltage;
        the voltage of a fuel cell (3) varies, with respect to reference values, by an amount greater than a given maximum admissible variation;
        the voltage of the fuel-cell stack (2) varies, with respect to reference values, by an amount greater than a given maximum admissible variation for a time longer than a maximum admissible time; and for a time longer than a maximum admissible time has elapsed from turning-on of the electric generator (1).

2. The procedure for controlling the electric generator (1) according to claim 1 wherein the controller (11) is configured for:
    acquiring the measurements of voltage and current supplied by the cell-voltage monitor (4) and by the electrical-energy management and conditioning unit (5);
    determining performance targets for the electrical-energy management and conditioning unit (5), the blower (6), and the hydrogen recirculator (7) on the basis of the measurements acquired and of management logics; and
    controlling the electrical-energy management and conditioning unit (5), the blower (6), the hydrogen recirculator (7), and the hydrogen-purging device (8) in such a way as to achieve said given performance targets.

3. The procedure for controlling the electric generator (1) according to claim 1 wherein said shut-down operation of the electric generator (1) is comprising the following operations:
    waiting for cooling of the fuel-cell stack (2) until a set temperature is reached by using a forced-cooling system;
    at the end of cooling, actuating the blower (6) in such a way as to eliminate the water condensed during cooling; and
    controlling the hydrogen-purging device (8) in such a way as to provide a continuous primary purging of hydrogen by opening the hydrogen-purging valve (9) and keeping it open carrying out a continuous primary purging of hydrogen;
    wherein these preceding operations are executed to insure that water does not remain inside bipolar plates of the fuel cell (3); wherein said water could occlude delivery of reagents to corresponding membrane-electrode assembly and hence prevent the fuel cell (3) from being brought into a condition of low hydration necessary for enabling a subsequent start-up of the electric generator (1).

4. The procedure for controlling the electric generator (1) according to claim 1 wherein said normal operation of the electric generator (1) comprises the controlling the electrical-energy management and conditioning unit (5) in such a way that, on the basis of the electric power required by the electrical load, the electric current drawn off from the fuel-cell stack (2) rises with a given rate of increase to settle at a current value corresponding to the electric power required by the electrical load and not higher than a given maximum current.

5. The procedure for controlling the electric generator (1) according to claim 1 wherein said normal operation of the electric generator (1) comprises the following operations:

detecting that one of the following conditions is verified:
a) the voltage of a fuel cell (3) is lower than a given minimum admissible voltage;
b) the voltage of a fuel cell (3) varies, with respect to a reference value, by an amount greater than a maximum admissible variation; and
c) the voltage of the fuel-cell stack (2) varies, with respect to a reference value, by an amount greater than a maximum admissible variation for a time longer than a maximum admissible time; and when one of the previous conditions is verified, controlling the electrical-energy management and conditioning unit (5) in such a way that the electric current drawn off from the fuel-cell stack (2) diminishes with a given rate of decrease, until the condition detected ceases.

6. The procedure for controlling the electric generator (1) according to claim 1 wherein said normal operation of the electric generator (1) comprises the following operations:
controlling the hydrogen recirculator (7) as a function of the electric power supplied by the electrical-energy management and conditioning unit (5); and when one of the previous conditions is verified:
controlling the blower (6) in such a way that it will supply a given flow rate of air over and above what is normally required; and
controlling the hydrogen-purging device (8) in such a way as to provide a primary purging of hydrogen by opening the hydrogen-purging valve (9) and a secondary purging of hydrogen by opening the secondary hydrogen-purging valve (10).

7. A software that can be loaded into a controller (11) of a PEM-fuel-cell-stack backup electric generator (1) and is designed, when executed, to cause the controller (11) to be configured as claimed in claim 1.

8. The procedure for controlling the electric generator (1) according to claim 1 wherein said hydrogen recirculator (7) performs two functions:
remove from the outlet of the fuel-cell stack (2) a portion of recirculated hydrogen and bringing it to the inlet of the fuel-cell stack (2);
increase the pressure of the hydrogen recirculated from the outlet of the fuel-cell stack (2) to the inlet of the fuel-cell stack (2).

* * * * *